E. C. FAUST, D. E. SPEICHER, AND R. B. ULLOM.
POULTRY AND STOCK FEEDER.
APPLICATION FILED MAR. 11, 1921.
1,409,841.
Patented Mar. 14, 1922.
2 SHEETS—SHEET 1.
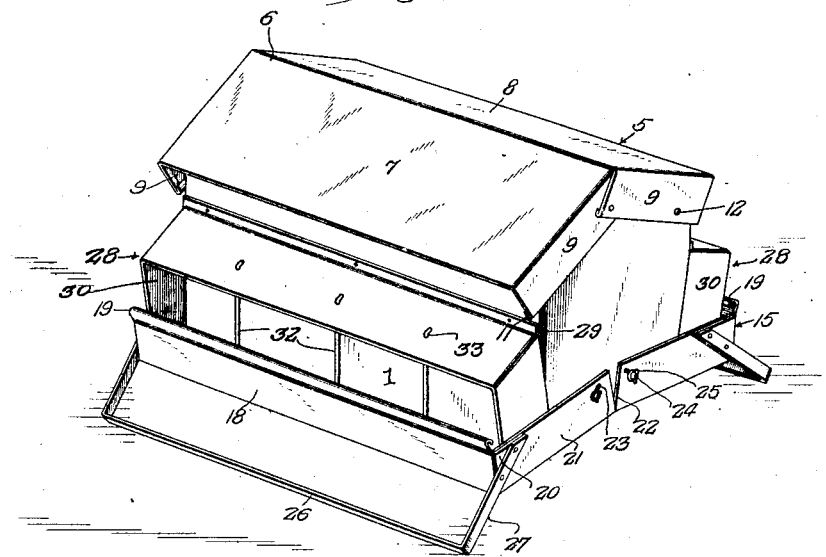
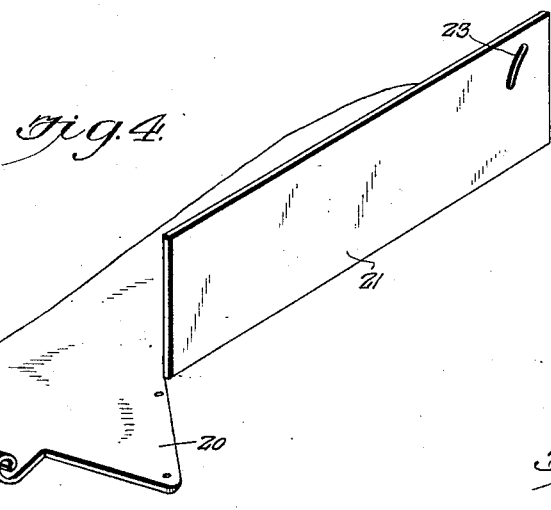
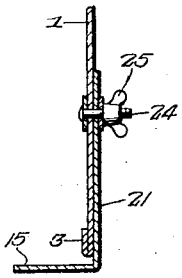
Inventor
E. C. Faust,
D. E. Speicher,
R. B. Ullom,
By Geo. F. Kimmel
Attorney

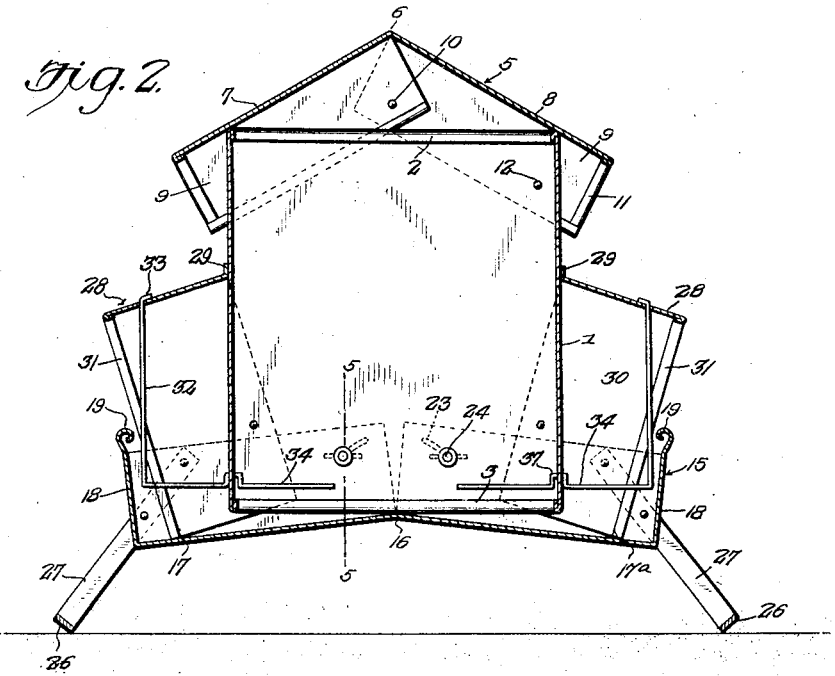

UNITED STATES PATENT OFFICE.

ELROY C. FAUST, DANIEL E. SPEICHER, AND RALPH B. ULLOM, OF URBANA, INDIANA, ASSIGNORS TO THE CYCLONE MANUFACTURING COMPANY.

POULTRY AND STOCK FEEDER.

1,409,841.  Specification of Letters Patent.  Patented Mar. 14, 1922.

Application filed March 11, 1921. Serial No. 451,652.

*To all whom it may concern:*

Be it known that we, ELROY C. FAUST, DANIEL E. SPEICHER, and RALPH B. ULLOM, all citizens of the United States, residing at Urbana, in the county of Wabash and State of Indiana, have invented certain new and useful Improvements in a Poultry and Stock Feeder, of which the following is a specification.

This invention relates to poultry and stock feeders of the self-feeding type.

The object of the invention is to provide a feeder of this type which may be cheaply constructed and in which the distributing or supply troughs are made integral with the bottom, the hopper and its bottom being so constructed and connected that the flow of feed to the troughs is regulated by varying the space between the bottom and the lower edges of the hopper.

Another object of the invention is to provide an apparatus of this character equipped with trash and rain guards for the troughs.

Still another object is to provide a feeder of this character with combined feed protectors for the troughs and agitators for the hopper.

In the accompanying drawings:—

Figure 1 represents a perspective view of a feeder constructed in accordance with this invention.

Fig. 2 is a transverse vertical section thereof.

Fig. 3 is a detail perspective view of the body or hopper proper detached, with parts broken out.

Fig. 4 is an enlarged detail sectional view of a portion of the bottom member, and Fig. 5 is a detail vertical section taken on the line 5—5 of Fig. 2.

In the embodiment illustrated, the body or hopper 1 of the feeder is shown rectangular in form and composed of a single sheet of metal bent to provide the side and end members, having its upper edge turned inwardly and folded flat against its inner face to provide a reinforcement shown at 2, while its lower edge is similarly folded to provide a reinforcement 3. The ends of the sheet metal strip or blank from which the body 1 is formed, are shown lapped at one corner (see Figure 3,) and secured by riveting.

The peaked top 5 is shown constructed of a single sheet of metal, bent longitudinally as shown at 6 to form the apex or ridge of the roof, the sides 7 and 8 sloping downwardly in opposite directions from said ridge and projecting at their lower edges beyond the side walls of the body 1, as is shown clearly in Fig. 2

The sheet of metal from which the roof 5 is formed is of a length greater than the length of the body 1, and the ends thereof are split longitudinally in alignment with the ridge 6 and bent inwardly at right angles to provide overlapping flanges 9, the inner ends of which lap and are secured by riveting, as shown at 10, while their lower edges are folded inwardly to form reinforcing flanges or beads 11.

This top 5 is hingedly mounted at one side of the hopper by pintles 12 which extend through the outer ends of the flanges 9 at one side of the top and engage the end walls of the hopper 1, as is clearly shown in Figs. 1 and 2.

This sloping or peaked roof 5 is designed to prevent fowls from roosting thereon, as well as to improve its appearance.

The end members of the hopper or body 1 of the feeder are provided with laterally spaced transversely aligned apertures 13 for a purpose presently to be described.

The bottom 15 of the feeder is also constructed of a single sheet of metal of substantially rectangular configuration, and considerably wider and longer than the hopper in connection with which it is to be used. The bottom has a longitudinally extending bend or fold 16 therein which divides it into two downwardly inclined members 17 and 17ª to form troughs at opposite sides of the hopper, the side edges of the said bottom being bent upwardly as shown at 18 to form the outer walls of the troughs. The edges of these walls 18 extend above the ends 21, presently to be described, and are rolled inwardly as shown at 19 to form guards to prevent the stock or poultry from pulling the food out of the troughs.

The ends of the bottom 15 are bent upwardly to form the end walls 21 of the troughs and are split transversely as shown at 22 at points in alignment with the longitudinal bend 16 in said bottom. The ends formed by the slits 22 are provided with arcuate slots 23 through which extend bolts 24, mounted in the apertures 13 of the end walls of the hopper 1, said bolts being provided at their outer ends with wing nuts 24ª, to provide for the adjustable connection of the hopper with the bottom. These arcuate slots 23, as shown clearly in Figs. 1 and 2, extend upwardly toward the corners of said ends which permit the hopper 1 to be moved vertically relatively to the bottom and thus vary the distance between the lower edge of same and said bottom for controlling the outflow of feed from the hopper to the troughs. The side walls 18 of the troughs are provided at their ends with triangular extensions 20 which are designed to be bent at right angles to said walls 18 and overlap the outer faces of the members 21 and are secured thereto by riveting, as shown clearly in Fig. 1.

Bail-shaped supports 26 are preferably provided for the feeder and, as shown are constructed of strap iron, the ends 27 thereof being engaged with the end of the trough members and secured thereto by the same rivets which connect the triangular extensions 20 with the end members 21. While these supports are preferably used, obviously they may be dispensed with if undesirable, and the device may rest on the bottom thereof.

The slot and bolt connections of the end members of the trough 21 with the hopper 1 also provide for the independent adjustment of the troughs relatively to each other as well as for a simultaneous adjustment, so that the flow of feed from the hopper into the troughs by changing the space between the bottom and the lower edge of the hopper may be regulated at will.

To protect the feed in the troughs from the weather and against the entrance of trash to the troughs, guards or shields 28 are provided, one at each side of the feeder and each preferably constructed of a single sheet of metal having one side edge bent to form an attaching flange, 29, which flange is riveted or otherwise secured to the opposed sides of the hopper 1 at points spaced from the top thereof. The sheet of metal forming the guard has right angularly disposed ends 30 which are disposed within and adjacent the end flanges 21 of the troughs and are positioned as shown in Fig. 2 with their front corners resting upon the bottom of the troughs and with their end corners lapping the ends of the hopper 1, thereby positioning the body portion or tops of the guards at a downwardly and forwardly incline to adapt them to shed rain, snow and the like. The front edges of the guards 28 project beyond the front walls of the troughs as is shown clearly in Figure 2 so that the guards will direct the water beyond the troughs and not into them. The front edges of the guards are preferably provided with reinforced inturned flanges or beams 31 as shown clearly in Fig. 2.

Depending from the top of the shields or guards 28 are a plurality of longitudinally spaced substantially L-shaped partition members 32 preferably constructed of heavy wire with one end extending through the guard and this forms a laterally extending finger or hook 33 whereby the partition members 32 are held engaged with the guards and yet permitted to swing laterally. The horizontally disposed arms 34 of the members 32 extend through the side walls of the hopper 1 and project some distance into the hopper. Each of said arms has a crank portion 37 at the point where it passes through the hopper wall and the projecting inner ends of said wires operate as agitators to stir up the feed within the hopper and prevent clogging thereof. The movement of these wires is accomplished by the fowl or animal feeding from the trough since when they contact with the vertical members of the wires these wires will swing laterally and their inner ends agitate the feed within the hopper while their outer portion will prevent the feeding animal pulling out the feed from the trough and wasting it.

The peculiar construction of this feeder comprising five main parts only, adapts it to be very cheaply constructed and avoid all danger of its being broken or the parts working loose. It is of course, understood that it may be constructed of any desired sheet metal, galvanized iron being preferably used.

The preferred embodiment of the invention is disclosed in the drawings and set forth in the specification, but it will be understood that any modifications within the scope of the claimed invention may be made in the construction without departing from the principle of the invention or sacrificing any of its advantages.

Having thus described the invention, what is claimed, is:—

1. In a feeder of the class described, a hopper, a top carried thereby, a bottom, feed discharge openings at the bottom of the hopper, troughs extending beyond said hopper in position to receive feed from the openings therein, and protective hoods for said troughs, carried by said hopper and overhanging the troughs, combined partitions and agitators mounted in said hood and hopper and projecting into the hopper, laterally movable in their supports.

2. In a feeder of the class described, a hopper, a top carried thereby, troughs mounted in a plane below said hopper and communicating therewith to receive the feed therefrom, shields for said troughs supported by said hopper and a plurality of swingably mounted members carried by said shields and projecting into the hopper to form combined partitions for the troughs and agitators for the feed in the hopper.

3. In a feeder of the class described, a hopper, troughs mounted in a plane below said hopper, and communicating therewith to receive the feed therefrom, shields for said troughs supported by said hopper, and a plurality of L-shaped bars having the free end of one arm swingably mounted in said shields and the other arm extending horizontally into said hopper, said bars forming combined partitions for the troughs and agitators for the feed in the hopper.

In testimony whereof, we affix our signatures hereto.

ELROY C. FAUST.
DANIEL E. SPEICHER.
RALPH B. ULLOM.